United States Patent [19]

Aldrich et al.

[11] Patent Number: 4,674,848

[45] Date of Patent: Jun. 23, 1987

[54] LASER MIRROR HAVING A COOLED, DEFORMABLE SURFACE

[75] Inventors: Ralph E. Aldrich, Acton; Steven M. Daigneault, Rockland, both of Mass.

[73] Assignee: Itek Corporation, Lexington, Mass.

[21] Appl. No.: 840,184

[22] Filed: Mar. 17, 1986

[51] Int. Cl.⁴ .......................... G02B 5/08; G02B 7/18
[52] U.S. Cl. ..................................... 350/610; 350/611
[58] Field of Search ............... 350/610, 611, 609, 608, 350/607, 588

[56] References Cited

U.S. PATENT DOCUMENTS

| 3,645,608 | 2/1972 | Staley et al. | 350/610 |
| 3,708,223 | 1/1973 | Sorensen et al. | 350/610 |
| 3,923,383 | 12/1975 | Engel et al. | 350/610 |
| 4,003,640 | 1/1977 | Hansen | 350/611 |
| 4,175,835 | 11/1979 | Kuhn | 350/610 |
| 4,492,431 | 1/1985 | Eitel et al. | 350/611 |

Primary Examiner—Jon W. Henry
Attorney, Agent, or Firm—Michael H. Wallach; Robert F. Rotella

[57] ABSTRACT

A laser mirror having a cooled deformable reflecting surface is disclosed. The mirror's base includes a manifold for distributing coolant toward the mirror's faceplate and for receiving coolant which has circulated through the faceplate. The faceplate is comprised of a thin, deformable sheet of material which has a polished surface for reflecting laser radiation therefrom. The facesheet is supported above the base manifold by one or more actuators which may be selectively operated to selectively deform the mirror's reflecting surface. The faceplate includes one or more enclosed, elongated spaces which transverse substantially the entire width of the faceplate and through which coolant may be circulated to cool the faceplate. Coolant conducting members located around the periphery of the faceplate carry coolant between the faceplate and the base manifold to remove heat absorbed by the faceplate from the laser signal impinging on the mirror's reflecting surface.

7 Claims, 5 Drawing Figures

LASER MIRROR HAVING A COOLED, DEFORMABLE SURFACE

BACKGROUND OF THE INVENTION

1. Field of the Invention

This invention relates to deformable mirrors for use as wavefront phase modulators in optical systems employing lasers which generate high energy flux levels. Such systems commonly utilize deformable mirrors to reflect a laser beam in a desired direction and/or to correct the laser beam for wavefront distortions, or to encode rhe laser beam by introducing known signals into the laser signal's wavefronts. Present day methods make it difficult to construct such a mirror so that it will reflect the totality of laser radiation incident on the mirror's reflecting surface. As a consequence, due to the flux level of the incident laser beam, the small portion of laser radiation that is absorbed can cause thermal overloading of the mirror's reflecting surface and its supporting structure, resulting in unwanted random distortions being created across the mirror's reflecting surface. In severe instances, the thermal overload can cause physical damage to, or destruction of, the mirror surface and/or its supporting structure.

2. Description of the Prior Art

The use of a fluid for cooling mirrors used in laser applications to dissipate thermal loads imposed by the laser beam are known in the prior art. See, for example, U.S. Pat. Nos. 3,909,118; 4,143,946; 4,202,605; or 4,239,343.

The use of deformable mirrors for correcting aberrations in laser wavefronts or for adding known distortions to laser signals is also known. It is generally appreciated that precise control of the deformations introduced into a mirror's reflecting surface must be maintained to insure that all measurable deviations in a laser signal are removed or, if the mirror is being used to encode a laser signal, to insure that the encoded signal closely replicates the signal intended to be encoded. Selective local deformation of the mirror's reflecting surface may be achieved by the use of piezoelectric actuators which may be selectively energized by the application of electrical signals thereto to produce mechanical forces which may be applied to the rear surface of the mirror. Precise control of the distortions introduced into the mirror's reflecting surface may be achieved by spacing the actuators close to each other and by having the surface area of the mirror influenced by each actuator being kept as small as possible, and by making the structure which carries the reflecting surface as thin and flexible as feasible. However, it is also known that the structure carrying the mirror's reflecting surface can absorb an appreciable quantity of heat when laser signals of high flux density impinge thereon and/or when the laser is operated continuously.

The laser mirror disclosed in this application provides a coolant path which avoids pumping coolant through actuators located in the central area of the mirror's reflecting surface by disclosing an arrangement in which the coolant is transferred toward and away from elongated, coolant-carrying channels which traverse substantially the entire width of the reflecting surface through coolant-conducting members which are positioned around the periphery of the reflecting surface. This arrangement permits the actuators used to control deformations within the central region of the reflecting surface to be packed densely together, thereby permitting very precise control of small surface areas of the mirror's reflecting surface, without the difficulty associated with making fluid-impervious connections between closely-spaced actuators and the central region of a mirror's reflecting surface.

SUMMARY OF THE INVENTION

It is an object of this invention to provide a deformable mirror in which the mirror's reflecting surface is cooled by a coolant which is transferred toward and away from the structure which contains the mirror's reflecting surface through coolant-carrying members fastened to the periphery of the mirror.

Another object of this invention is to provide a mechanism for cooling a deformable mirror's reflecting surface in which the coolant is transferred toward and away from the structure of the mirror containing the reflecting surface by members which do not cause an appreciable stiffening of the mirror's reflecting surface.

Still another object of the invention is to provide a deformable mirror in which the coolant used to cool the mirror's reflecting surface is distributed toward the reflecting surface by a manifold which is an integral element of the mirror's supporting structure.

The foregoing and other objects and advantages are achieved by providing a deformable mirror in which the faceplate on which the mirror's reflecting surface is formed has one or more elongated, enclosed, coolant-carrying channels which substantially traverse the entire width of the faceplate. The mirror may be selectively deformed by selectively applying signals to actuators which are fastened between a base containing a coolant distribution manifold and the mirror's faceplate. Coolant-carrying members connected between the base manifold and the coolant-carrying channels in the faceplate transfer coolant toward and away from the faceplate. The coolant-carrying members are located around the periphery of the mirror's reflecting surface to permit them to be fastened to the faceplate without interfering with the density or pattern of actuators available to deform the mirror's central reflecting region. Coolant is pumped into the manifold by any conventional means, for example by means of an external pump, and is distributed through the manifold to one or more of the coolant-carrying members. The coolant-carrying members deliver the coolant to the enclosed, coolant-carrying channels in the faceplate. The coolant is forced through the channels by the pressure of the external pump and, after flowing across the surface of the faceplate, passes back into the manifold through others of the coolant-carrying members. The use of the coolant-carrying members located on the periphery of the faceplate eliminates the need for heavy edge manifolding around the edge of the faceplate to distribute the coolant, thereby eliminating the edge stiffness incurred in some prior-known cooled deformable mirror structures which used edge-manifolding to distribute coolant through the structure containing the mirror's reflecting surface.

BRIEF DESCRIPTION OF THE DRAWINGS

The above objects and other advantages of the invention will be best appreciated upon examination of the detailed description of a preferred embodiment when read in conjunction with the accompanying drawings in which.

DETAILED DESCRIPTION OF A PREFERRED EMBODIMENT

Figure 1:
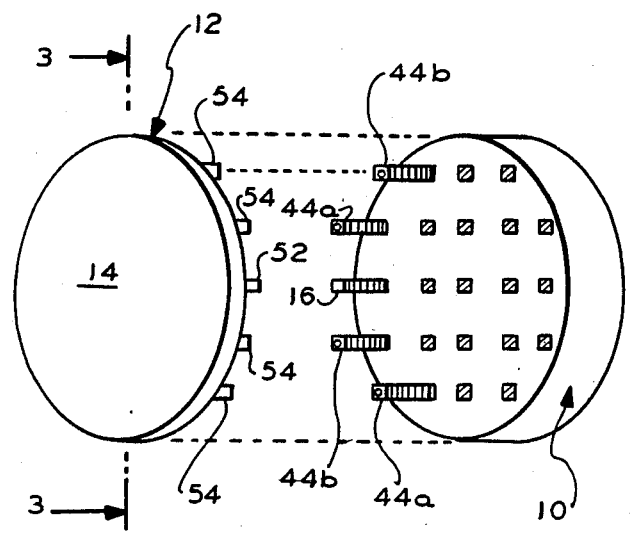
FIG. 1 is a perspective view of a partially disassembled cooled deformable mirror constructed in accordance with the teachings of the invention, showing selected ones of the actuators and selected ones of the coolant conducting members.
Figure 2:
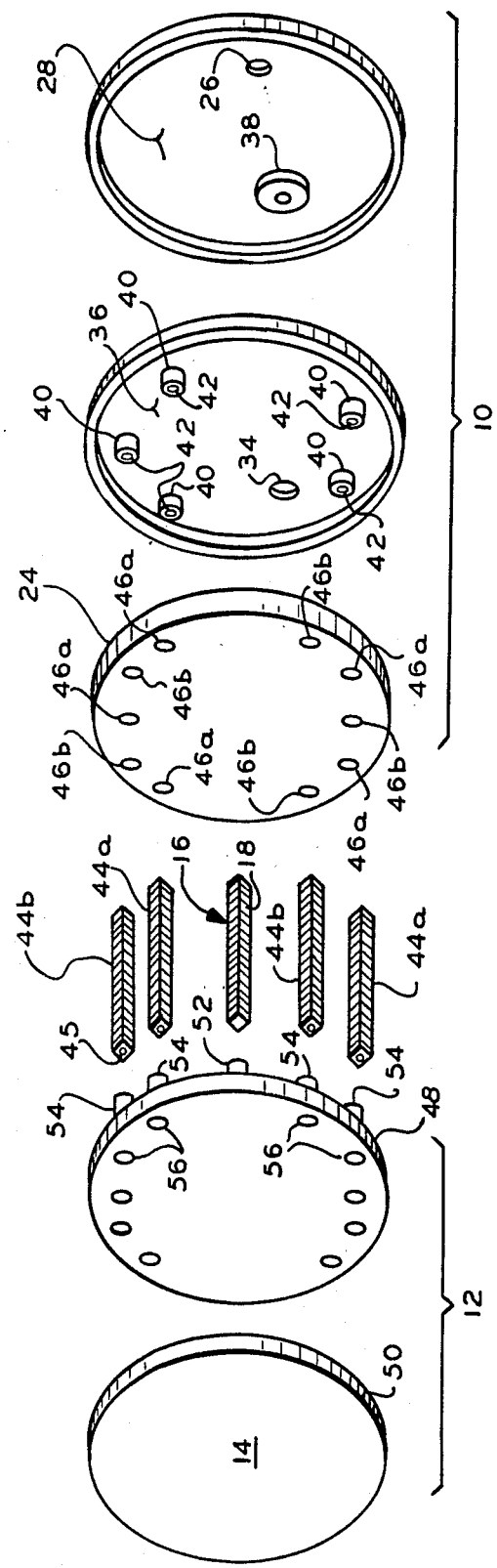
FIG. 2 is an exploded perspective view showing the components of the cooled deformable mirror of FIG. 1.

Referring to the drawings, and in particular to FIGS. 1 and 2, a laser mirror having a cooled, deformable reflecting surface is shown which has been constructed in accordance with the teachings of the invention. FIG. 1 shows that the mirror includes a base manifold shown generally at 10, and a faceplate which is shown generally at 12. The faceplate includes a reflecting surface 14 on one side thereof which is polished and/or coated to reflect optical radiation therefrom. Preferably the components of the faceplate 12 may be manufactured from single crystal silicon. The faceplate 12 is fastened to and supported away from the manifold 10 by a plurality of actuators 16, selected ones of which are shown in FIG. 1. In the preferred embodiment disclosed herein, each actuator 16 is comprised of a stack of piezoelectric material having individual layers 18 which are separated from each other by interleaved electrodes. A preferred example of how such an actuator may be constructed may be had by reference to U.S. Pat. No. 4,257,686 which issued on Mar. 24, 1981 and which is owned by the assignee of the present invention and the teachings of which are incorporated herein by reference. While the aforementioned patent discloses actuators made of lead zirconate titanate (PZT), it should be understood that the actuators may be made from any material which can be made to undergo elongation in response to the application of an electrical potential thereto, as for example lead magnesium niobate (PMN) or barium titanate. The actuator block disclosed in the aforementioned U.S. Pat. No. 4,257,686 is cut into individual actuators, each of which may in the preferred embodiment be approximately 0.3 cm wide by 0.3 cm deep and 1.0 cm long. Electrical signals are fed to the actuators 16 in any conventional manner, as for example by the use of the technique disclosed in the aforementioned U.S. Pat. No. 4,257,686 or by the method shown and described in U.S. Pat. No. 3,904,274 which issued Sept. 9, 1975 and which is owned by the assignee of the present invention and the teachings of which are incorporated herein by reference.

Figure 3:
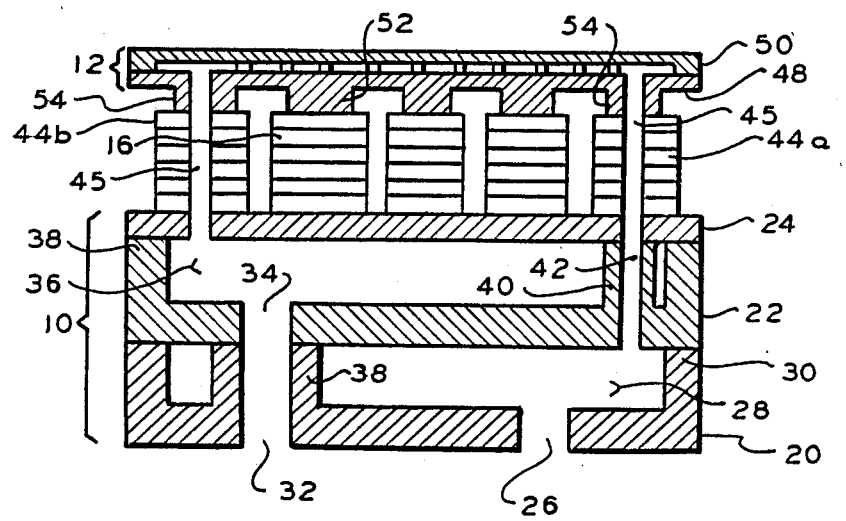
FIG. 3 is a sectional view of an assembled deformable mirror taken through line 3—3 of FIG. 1.

FIGS. 2 and 3 show that the base manifold 10 is comprised of a lower baseplate 20, an upper baseplate 22 and a cover plate 24. Preferably the components of the base manifold 10 may be manufactured from single crystal silicon. The lower baseplate has an aperture 26 into which coolant may be pumped and a chamber 28 to receive the coolant. The lower baseplate also includes a wall 30 encircling the lower baseplate. A second aperture 32 is provided in the lower baseplate for draining coolant away from the manifold 10. The upper baseplate 22 overlies and is supported by the lower baseplate 20 and includes an aperture 34 for draining coolant away from the chamber 36 formed within the upper baseplate 22. The lower baseplate 20 includes a post 38 which permits coolant passing through the aperture 34 in the upper baseplate to be conducted through the lower baseplate 20 and out through the aperture 32. The upper baseplate 22 includes a wall 39 which supports the cover plate 24. The upper baseplate 22 also includes a plurality of posts 40 each of which have apertures 42 passing therethrough.

The coverplate 24 supports the actuators 16. A plurality of coolant-conducting members 44a and 44b are fastened between the coverplate 24 and the faceplate 12. Each member 44a and 44b has a coolant carrying channel 45 passing therethrough to conduct coolant between the base manifold 10 and the faceplate 12. The members 44a and 44b are aligned over a plurality of apertures 46a and 46b on the coverplate 24 with coolant flowing up through the apertures 46a and into the members 44a and with coolant flowing out of the members 44b through the apertures 46b. The members 44a and 44b may be of any design which will conduct coolant toward and away from the faceplate 12 and, for example, may even be comprised of actuators such as the actuators 16. The members 44a and 44b are positioned around the periphery of the faceplate 12 so that they are located at the edge of the faceplate 12 away from the central region from which laser signals are reflected. If the members 44a and 44b are comprised of actuators which are to be used to influence the shape of the deformable mirror's reflecting surface 14, then the coolant channels 45 are coated with a coolant impervious dielectric coating as is more fully described in U.S. patent application Ser. No. 768,768, filed Aug. 23, 1985, the teachings of which are incorporated herein by reference. If the members 44s and 44b are not actuators, then they are manufactured from a material which has a coefficient of thermal expansion which is similar to the coefficient of thermal expansion of the actuators 16, so that they do not elongate at a faster rate or greater than the actuators 16 and impose mechanical stresses on the faceplate 12 when they absorb heat. The members 44a and 44b may also be made from flexible tubing, such as a vinyl or teflon tubing, to permit them to carry coolant while avoiding imposing any mechanical stress on the faceplate 12 due to thermal expansion.

Figure 2B:
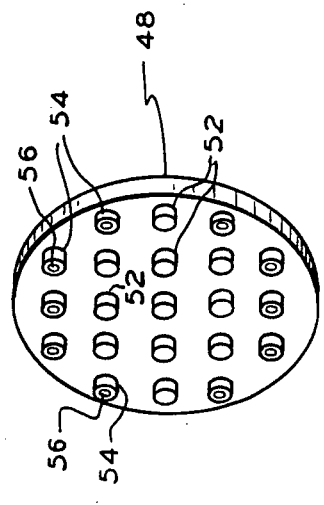
FIG. 2B is a view of the underside of the lower plate of the faceplate.
Figure 2A:
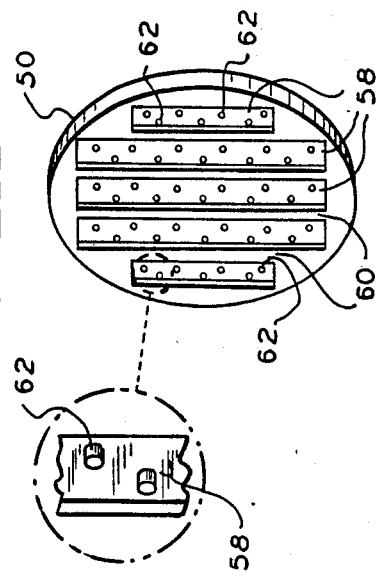
FIG. 2A is a view of the underside of the upper plate of the faceplate.

The faceplate 12 is comprised of a lower plate 48 and an upper plate 50. FIG. 2B shows that the lower plate 48 includes a plurality of posts 52 which may be either mechanically fastened to or formed integral with the plate 48. Each post 52 contacts a respective actuator 16 so that the actuators may deform the reflecting surface 14 of the deformable mirror when the actuators are elongated by the application of an electrical signal thereto. The plate 48 also includes selected posts 54 around its periphery which have apertures 56 passing therethrough to permit coolant passing through the support members 44a and 44b which contact the posts 54 to pass through the posts 54 and cool the faceplate 12. FIG. 2A shows that the upper plate 50 includes a plurality of coolant-carrying spaces 58 which are separated from each other by walls 60. The spaces 58 traverse substantially the entire width of the faceplate 12. In the preferred embodiment disclosed herein, each space 58 includes a plurality of posts 62 which are positioned within the spaces 58 to conduct heat away from the reflecting surface 14 of the upper plate 50 and into the coolant, and to transfer mechanical forces induced in the lower plate 48 by the actuators 16 into the upper plate 50. Each space 58 is in contact with two posts 54 with a one of said posts 54 delivering coolant toward a one of said spaces 58 and with a second one of said posts removing coolant from a one of said spaces 58 after the coolant has flowed through said space 58. In a preferred embodiment of the cooled deformable mirror disclosed herein, coolant will travel in opposite directions in adjacent spaces 58.

The members 44a and 44b are fastened to the coverplate 24 and to the posts 54 using any conventional sealing technique to prevent coolant from leaking from the connection between the members 44a and 44b and the plate 24 or the plate 48. These techniques can, for example, include brazing or frit bonding, or an epoxy bond.

Coolant, for example water or an ethylene glycol-water combination, may be introduced into the base manifold 10 via the aperture 26 using any known pumping technique, for example an electrically-driven recirculating pump. The coolant spreads through the space 28 and up through the apertures 42 and through the apertures 46a in the coverplate 24. The coolant then passes through the apertures 45 in members 44a and through the spaces 58 where it absorbs heat from the faceplate 12. After flowing through the spaces 58, the coolant passes through the support members 44b and through the apertures 46b in the coverplate 24 and into the space 36 in the upper baseplate 22. The coolant drains away from the manifold 10 via the aperture 34 in post 38 and through the aperture 32 in the bottom of the baseplate 20.

What has been described is a novel structure for a cooled deformable mirror in which the coolant is transferred toward and away from one or more spaces in the mirror's faceplate via members which are located on the periphery of the mirror's reflecting surface. While a preferred embodiment of the invention has been described herein, it is to be understood that many variations and modifications may suggest themselves to one skilled in the art and still be within the teachings of the claimed invention. While other components, dimensions, materials and configurations may be substituted for those disclosed herein, it is intended that the invention be limited only by the permissible scope of the following claims.

We claim:

1. A laser mirror having a cooled, deformable reflecting surface, said mirror being comprised of:
   a. a thin faceplate having a central region, said faceplate being capable of being selectively deformed by the application of mechanical forces thereto, said faceplate having a first, top side and a second, bottom side, said top side having a reflecting surface for reflecting an incident beam of electromagnetic radiation, said faceplate having one or more enclosed, elongated spaces contained therein for receiving a coolant for cooling said faceplate, each of said elongated spaces traversing substantially the entire width of said faceplate, each of said one or more elongated spaces in said faceplate having a first aperture through which coolant may be introduced into said elongated space and a second aperture through which coolant may be drained away from said elongated spaces, said first and said second apertures being located on said second, bottom side of said faceplate at distal ends of said elongated spaces;
   b. a base manifold, said base manifold including means for distributing coolant toward said faceplate and means for collecting coolant which has been circulated through said one or more enclosed spaces in said faceplate;
   c. a plurality of actuators located between the second, bottom side of said faceplate and said base manifold, said actuators being selectively operable by the application of signals thereto to elongate said actuators and to thereby selectively impart to said faceplate mechanical forces to effect the selective deformation of the reflecting surface of said faceplate;
   d. at least two of said actuators being coolant-carrying actuators, said coolant-carrying actuators having passages therethrough to permit coolant to be transferred between said faceplate and said base manifold, at least a first of said coolant-carrying actuators fastened between said means for distributing coolant in said base manifold and a one of said first aperture in the second side of said faceplate, at least a second one of said coolant-carrying actuators fastened between a second one of said apertures in the second side of said faceplate and said means for collecting coolant in said base manifold, said first and said second apertures being in coolant-communicating relationship to a common one of said enclosed spaces in said faceplate, said coolant-carrying actuators being located at the periphery of said faceplate away from the central region of said faceplate;
   e. means for circulating coolant toward and away from said base manifold;
   whereby said faceplate is cooled by coolant circulating from said base manifold through at least a first of said coolant-carrying actuators to said faceplate and through at least one of said elongated spaces in said faceplate and back to said base manifold through at least a second of said coolant-carrying actuators.

2. The laser mirror of claim 1 wherein said bottom side of said faceplate includes pusher pads, each of said pusher pads being positioned on the bottom side of said faceplate to mechanically contact a one of said actuators to receive the mechanical forces generated by each of said actuators and transfer said mechanical forces generated by each of said actuators into said faceplate.

3. The laser mirror of claim 1 wherein said faceplate contains more than one elongated, fluid-receiving space.

4. The laser mirror of claim 3 wherein coolant is circulated in opposite directions in adjacent fluid-receiving spaces.

5. The laser mirror of claim 1 wherein said base manifold is constructed from the same material as said faceplate.

6. The laser mirror of claim 1 wherein each of said elongated spaces include one or more posts located within said elongated space, each of said one or more posts extending substantially from said top side to said bottom side of said faceplate to conduct heat from said faceplate into said coolant.

7. The laser mirror of claim 1 wherein said actuators are electrodistortive actuators.

* * * * *